United States Patent [19]
Shaniuk et al.

[11] Patent Number: 6,030,537
[45] Date of Patent: *Feb. 29, 2000

[54] METHOD FOR REMOVING ARSENIC FROM AQUEOUS SYSTEMS CONTAINING COMPETING IONS

[75] Inventors: Thomas J. Shaniuk, Strongsville, Ohio; Robert V. Russo, Brooklyn, N.Y.; Arthur F. Greene, Lakewood, Ohio

[73] Assignee: Engelhard Corporation, Iselin, N.J.

[*] Notice: This patent issued on a continued prosecution application filed under 37 CFR 1.53(d), and is subject to the twenty year patent term provisions of 35 U.S.C. 154(a)(2).

[21] Appl. No.: 08/691,639

[22] Filed: Aug. 2, 1996

[51] Int. Cl.⁷ .......................................................... C02F 1/28
[52] U.S. Cl. ............................ 210/683; 210/660; 502/414
[58] Field of Search .............................. 502/414; 210/684, 210/688, 683, 660

[56] References Cited

U.S. PATENT DOCUMENTS

| | | | |
|---|---|---|---|
| 3,862,054 | 1/1975 | Sokolsky et al. | 252/463 |
| 3,965,042 | 6/1976 | Feldwick et al. | 252/463 |
| 4,166,100 | 8/1979 | Vorobiev et al. | 423/626 |
| 4,882,066 | 11/1989 | Portier | 210/679 |
| 4,935,146 | 6/1990 | O'Neill et al. | 210/684 |
| 5,017,318 | 5/1991 | Vanderbilt et al. | 264/113 |
| 5,096,871 | 3/1992 | Lever et al. | 502/411 |
| 5,133,871 | 7/1992 | Levy | 210/688 |
| 5,254,516 | 10/1993 | Gupta et al. | 502/84 |
| 5,296,438 | 3/1994 | Heung | 502/407 |
| 5,387,738 | 2/1995 | Beckham | 588/256 |
| 5,401,416 | 3/1995 | Levy | 210/668 |
| 5,490,907 | 2/1996 | Weinwurm et al. | 203/29 |

OTHER PUBLICATIONS

J.H. Gulledge & J.T. O'Connor, "Removal of Arsenic (V) from Water by Adsorptioin on Aluminum and Ferric Hydroxides," Water Technology/Quality Journal AWWA, Aug., pg. 548–552 (1973).

M.A. Anderson, J.F. Ferguson and J. Davis, "Arsenate Adsorption on Amorphous Aluminum Hydroxide," Journal of Colloid and Interface Science, vol. 54, No. 3, Mar. (1976).

D. Clifford and C. Lin, "Arsenic (III) and Arsenic (V) Removal from Drinking Water in San Ysidro, New Mexico,," U.S. EPA /600/S–2–91–011 Jun. (1991).

S.K. Gupta and K.Y. Chen, "Arsenic Removal by Adsorption," Journal WPCF, pg. 493–506, Mar. 1978.

R.V. Russo, T.J. Shaniuk, "Arsenic Update—Regulation & Remediation", Water Conditioning Purification, Oct. 1996, pp. 84–90.

*Primary Examiner*—Cynthia L. Nessler
*Attorney, Agent, or Firm*—Raymond F. Keller

[57] ABSTRACT

Disclosed is a method for removing arsenic from aqueous systems containing arsenic which includes contacting said aqueous system with an adsorbent material comprising (i) activated bauxite and (ii) aluminum trihydrate, until the arsenic is substantially removed from said aqueous system. The adsorbent material is prepared by the steps including (i) mixing powders of activated bauxite and aluminum trihydrate in the presence of water to form granules; (ii) drying said granules; and (iii) calcining said dried granules.

7 Claims, 1 Drawing Sheet

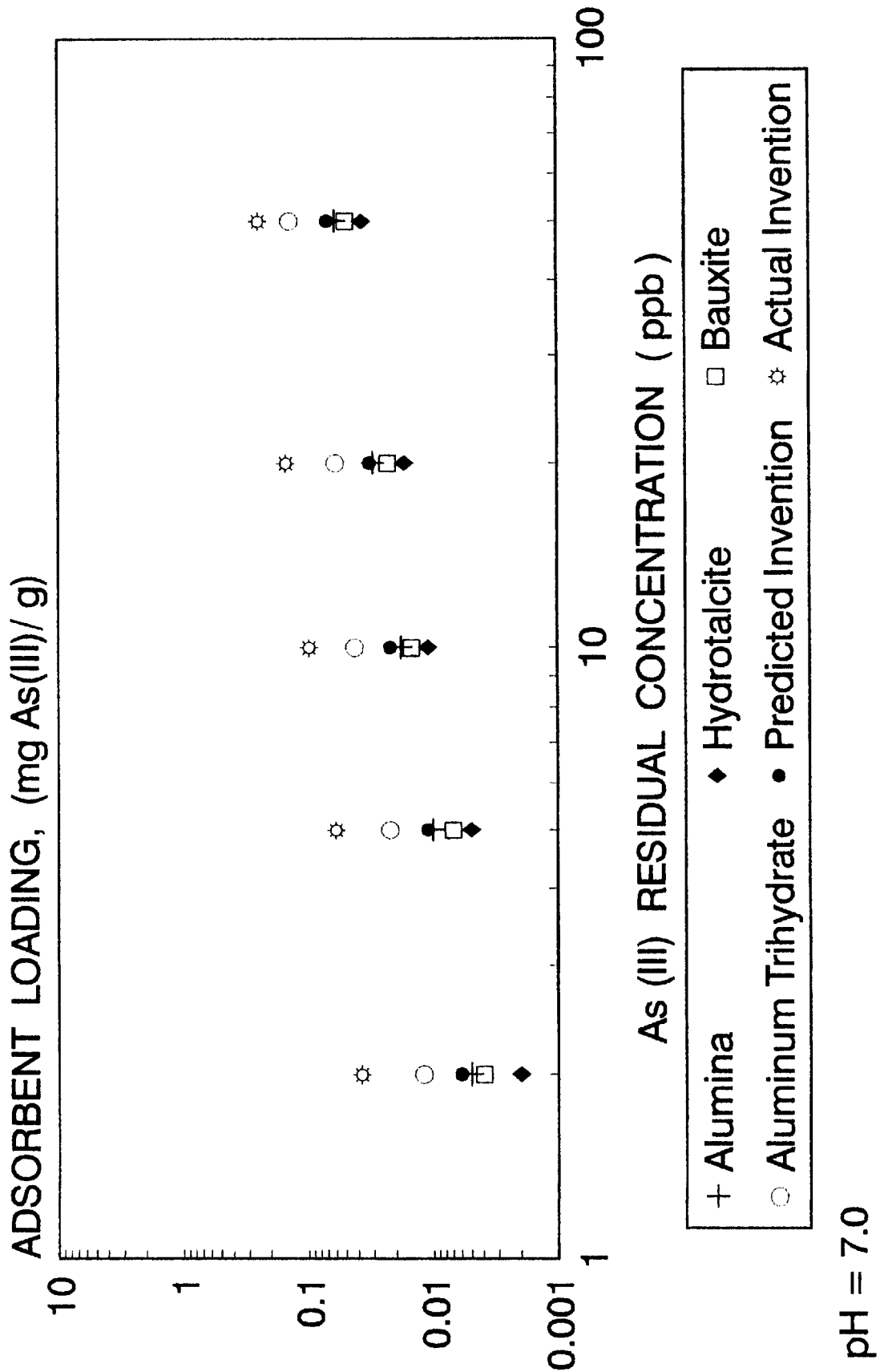

METHOD FOR REMOVING ARSENIC FROM AQUEOUS SYSTEMS CONTAINING COMPETING IONS

BACKGROUND OF THE INVENTION

1. Field of the Invention

This invention relates to a novel process for the removal of arsenic from aqueous systems containing competing ions utilizing an improved absorbent material.

2. Description of Related Art

Arsenic, classified by the EPA as a Class A carcinogen, is the 20th most abundant element in the earth's crust. As a result, arsenic contamination of drinking water sources is common, particularly in the western United States.

The removal of arsenic from water by adsorption is generally known in the art. See, for example, J. H. Gulledge and J. T. O'Connor, "Removal of Arsenic (V) from Water by Adsorption on Aluminum and Ferric Hydroxides," *Water Technology/Quality Journal AWWA*, August, pages 548–552 (1973) and M. A. Anderson, J. F. Ferguson and J. Gavis, "Arsenate Adsorption on Amorphous Aluminum Hydroxide," *Journal of Colloid and Interface Science*, Vol. 54, No. 3, March (1976).

Also, D. Clifford and C. Lin, "Arsenic (III) and Arsenic (V) Removal from Drinking Water in San Ysidro, N.M.," U.S. EPA Project Summary—EPA/600/S2-91-011 June (1991), report results of using activated alumina for the removal of arsenic from drinking water.

S. K. Gupta and K. Y. Chen, "Arsenic Removal by Adsorption" *Journal WPCF*, pages 493–506, March 1978, report using activated alumina, activated bauxite and activated carbon as adsorbents for arsenic in water.

U.S. Pat. No. 4,935,146 describes a method for reducing the amount of a first contaminant and second contaminant in a solution to environmentally safe levels, said solution having a substantially greater amount of the first contaminant than the second contaminant. The method comprises: contacting the solution with an activated or calcined product of a compound having the formula $A6B2(OH)16C.4H2O$, wherein A is a divalent metal cation, B is a trivalent metal cation and C is a mono- to tetravalent anion. The method further comprises separating the solution from the contacted product.

It is anticipated, however, that the EPA's current maximum concentration limit for arsenic in drinking water of 50 micrograms per liter (50 parts per billion) will be reduced to below 10 micrograms per liter, as already has been done (1995) by the World Health Organization.

In view of these likely more stringent EPA regulations for arsenic, there is still a need for adsorbent materials which are effective at removing arsenic levels to lower than ten parts per billion and which have arsenic loading level capabilities suitable for use in commercial applications.

SUMMARY OF THE INVENTION

This invention relates to a process for removing arsenic from aqueous systems, a process for preparing adsorbent materials for this use and adsorbent materials prepared by that process.

In one embodiment, this invention relates to a method for removing arsenic from aqueous systems containing arsenic which comprises contacting said aqueous system with an adsorbent material comprising (i) activated bauxite and (ii) aluminum trihydrate, until the arsenic is substantially removed from said aqueous system.

In another embodiment, the adsorbent material is prepared by the steps comprising (i) mixing powders of activated bauxite and aluminum trihydrate in the presence of water to form granules; (ii) drying said granules; and (iii) calcining said dried granules.

BRIEF DESCRIPTION OF THE DRAWINGS

FIG. 1 is a graph of data from Table I.

DESCRIPTION OF THE PREFERRED EMBODIMENT

As previously stated, the method of this invention is for removing arsenic in aqueous systems containing arsenic as well as other competing ions. The aqueous systems to which the method of the instant invention is typically applied are industrial, municipal or residential water streams. A preferred use for this method is in the treatment of drinking water. US drinking water supplies typically contain less than 5 ppb (micrograms/liter). However, elevated arsenic concentrations are common in groundwaters of the western United States as well as in parts of India, Thailand, and other regions of the world. Higher concentrations, up to several hundred micrograms per liter, also occur in surface waters influenced by hydrothermal inputs. The problem is most acute in desert regions where well water (ground water) is the source. Arsenic removal from aqueous streams becomes complicated when there is also a presence of other contaminants, i.e., competing ions. Such competing ions include alkaline earth metals, particularly calcium or magnesium sulfates, phosphates and halide ions such as chlorides or fluorides. Commonly, the presence of these competing ions in amounts of from about 50 ppm up to about 800 ppm more typically from about 200 up to about 300 ppm. The presence of these competing ions makes arsenic removal from aqueous system much more difficult. Primarily, the other ions present will compete for available adsorption sites on the adsorbent materials and lower the arsenic removal efficiency.

In drinking water treatment, the most common competing ions are sulphate, phosphate, chloride and fluoride ions.

Bauxite, which is suitable for use in the instant invention, is composed principally of hydrated aluminum oxide ($Al_2O_3.xH_2O$) and contains small quantities of silica, titania, kaolinate and hematite ($Fe_2O_3$). Bauxite is principally $Al_2O_3.2H_2O$. Activated bauxites are well known to those skilled in the art. Activation of Bauxite is usually accomplished by heat treatment, typically at about 350° C. or more, and up to about 700° C., preferably from about 350° C. up to about 500° C. The media is exposed to high temperatures for approximately 30 to 60 minutes. The media can undergo heat treatment for longer periods of time without detrimental effects. It is desirable that the activated bauxite suitable for the instant invention contain at least 5% weight iron as $Fe_2O_3$ and 2% by weight $TiO_2$. Preferably, the activated bauxite has an iron content of from about 5% up to about 15% by weight as $Fe_2O_3$ and a titanium content of from about 2% up to about 5% by weight as $TiO_2$. The properties of a preferred activated bauxite are:

| | |
|---|---|
| Volatile Material, % (Wt. Loss @ 980 C) | 9 |
| Mesh Grades | minus 60 |
| Chemical Composition % | $Al_2O_3$-73–78 |

-continued

| | |
|---|---|
| Typical | $Fe_2O_3$-8–16 |
| (Volatile Free Basis) | $TiO_2$-4 |
| | $SiO_2$-6–9 |
| | Insol.-1 |
| Bulk weight Typical | 57 lbs./cu.ft. |

The aluminum trihydrate useful for this invention is also commonly known as alumina trihydrate, aluminum hydroxide, alumina hydrate, hydrated alumina, hydrated aluminum oxide, gibbsite, pseudoboehmite and is represented by the formulas $Al_2O_3 \cdot 3H_2O$, $Al(OH)_3$, or $AlOOH$ which may be as a crystalline material or as a gelatinous precipitate.

Preferably, the aluminum trihydrate should be a dry crystalline powder with at least 70% by weight solids on a moisture-free basis. The remainder being free and bound water. As used herein, moisture-free basis means solids weight after heat treatment at 500° C. for 1 hour. Average particle size of the powder being from about 20 microns up to about 75 microns. Surface area of the powder is typically 300 m²/g.

The process of this invention may be carried out by having the activated bauxite and aluminum trihydrate in close proximity to each other as the aqueous system is contacted with these materials. Preferably, the activated bauxite and aluminum trihydrate are in intimate contact with each other and more typically are intimately mixed and combined into a granule.

The adsorbent material useful for the purposes of this invention is comprised of at least 50% by weight on a moisture-free basis of activated bauxite and at least about 25% by weight on a moisture-free basis of aluminum trihydrate. Preferably, said absorbent material comprises from about 50 up to about 75% by weight on a moisture-free basis of activated bauxite and from about 25 up to about 50% by weight on a moisture-free basis of aluminum trihydrate.

The adsorbent materials are preferably prepared by mixing powders of the activated bauxite and aluminum trihydrate in the presence of water so as to form granules. The powders can also be formed into 1/32" to 1/8" diameter extrudates. The formed adsorbent materials are dried and then calcined. The drying step is typically conducted at 100° C. to 120° C. The dried granules are then calcined at a temperature of about 500° C. and preferably from about 350° C. up to about 700° C.

The formed adsorbent materials are typically packed into a fixed-bed adsorbent column or container. The arsenic containing aqueous stream is pumped into the adsorbent bed system in either an up-flow or down-flow fashion. Treated water with significantly reduced levels of arsenic will flow out of the system. Empty bed contact times need to be greater than one minute. Preferably, the contact time should be five minutes or greater for best results. Arsenic concentrations in the effluent needs to be less than 50 ppb (micrograms/liter) to be considered substantially removed, however, the effluent concentrations can be as low as 2 ppb. The capacity of the adsorbent material will be higher with higher levels of arsenic permitted in the effluent stream. Alternately, the adsorbent materials of this invention can be used in a powder form for arsenic removal. The adsorbent powder can be combined with carbon, alumina, polymer binder, or other powders and formed into a multi-component block cartridge filter. The adsorbent powder can also be used as is in water treatment or clarification systems and in pre-coat filter/adsorption systems.

Examples of this invention are included hereinbelow. Of course, these examples are not intended as limiting this invention as modification of the examples by ordinary expedient will be readily apparent to those of ordinary skill in the art.

Unless otherwise indicated in the following examples and elsewhere in the specification and claims, all parts and percentages are by weight, temperatures are in degrees Celsius, pressures are at or near atmospheric.

EXAMPLE 1

In this example 1000 parts of activated bauxite powder (Porocel® R.I. powder, minus 60 mesh grade, 8% $Fe_2O_3$ and 4% $TiO_2$) is mixed with 470 parts of aluminum trihydrate (Laroche Versal™ 250) for three minutes in an Eirich Mixer, then 863 parts of deionized water is added to the powders while mixing to form small granules. The granules are dried at 110° C. for 16 hours, screened to 20×60 mesh, and then calcined for one hour at 500° C.

Arsenic adsorption isotherms are determined by batch adsorption experiments. Plastic bottles are first pre-conditioned by soaking in a 1% nitric acid solution for one hour and then rinsing with deionized water. A specific amount of adsorbent, equivalent to a 2 g/l adsorbent loading, is placed into pre-conditioned plastic bottles containing varying concentrations of sodium arsenite (As III) spiked with 250 ppm $SO_4$ at a pH of 7.0. The bottles are sealed and placed into a reciprocating shaker for 18 hours at room temperature. After shaking, the adsorbent is filtered off and the liquid filtrate is loaded into other pre-conditioned plastic bottles. The resultant filtrate is preserved by the addition of a few drops of 1% nitric acid solution to prevent arsenic loss on the walls of the bottles or metal precipitation. The final residual concentration of arsenic is measured using a Perkin-Elmer 5100 ZL Graphite Furnace Atomic Adsorption Spectrometer.

Adsorbent capacity, at varying residual arsenic concentrations, is calculated using a form of the Freundlich equation:

$$\text{Adsorbent capacity } (x/m) = (Co - Cf)/m \text{ [mg/g]}$$

where Co=initial arsenic concentration [mg/l]

Cf=residual arsenic concentration [mg/l]

m=adsorbent loading [g/l]

Adsorption capacities were calculated for Alcoa® F-1 activated alumina granules, Alcoa SORBPLUS® activated hydrotalcite granules, Porocel® activated bauxite granules, activated alumina trihydrate granules, and the invention (i.e. activated bauxite/aluminum trihydrate granules). The results are given in the following table:

TABLE I

| Adsorbent | Adsorbent Capacity (mg/g)@ As (III) residual concentrations (ppb) of | | | | | | |
|---|---|---|---|---|---|---|---|
| | 1 | 2 | 5 | 10 | 20 | 50 | 100 |
| Alumina | 0.003 | 0.005 | 0.01 | 0.018 | 0.03 | 0.06 | 0.12 |
| Hydrotalcite | 0.001 | 0.002 | 0.005 | 0.011 | 0.017 | 0.037 | 0.09 |

TABLE I-continued

| | Adsorbent Capacity (mg/g)@ As (III) residual concentrations (ppb) of | | | | | | |
|---|---|---|---|---|---|---|---|
| | 1 | 2 | 5 | 10 | 20 | 50 | 100 |
| Activated Bauxite (Porocel ® RI Powder) | 0.002 | 0.004 | 0.007 | 0.015 | 0.023 | 0.05 | 0.11 |
| Aluminum Trihydrate (LaRoche Versal ™ 250) | 0.008 | 0.012 | 0.022 | 0.042 | 0.06 | 0.14 | 0.25 |
| Invention (Example 1) | 0.022 | 0.038 | 0.06 | 0.098 | 0.15 | 0.25 | 0.41 |
| Predicted* | 0.004 | 0.006 | 0.011 | 0.022 | 0.032 | 0.07 | 0.14 |

*Calculation based on 75% activated Bauxite (Porocel ® RI) and 25% aluminum trihydrate (LaRoche Versal ™ 250)

The invention demonstrates significantly improved arsenic removal capacity over either activated bauxite or aluminum trihydrate alone. These results showed an unexpected, synergistic effect whereby the combination of activated bauxite and alumina trihydrate remove arsenic at higher adsorbent capacities (e.g., As (III) residual concentration of 10 ppb: bauxite, alumina trihydrate, and the invention showed adsorbent capacities of 0.015, 0,042, and 0.098 mg As (III) per gram of adsorbent, respectively). The results were unexpected in that the invention removed arsenic significantly better than the predicted performance calculated based on the individual performance of the components used in Example 1.

We claim:

1. A method for removing arsenic from aqueous systems containing arsenic which comprises
   mixing powders comprising a combination of (i) at least about 50% by weight (moisture free basis) activated bauxite and (ii) at least about 25% by weight (moisture free basis) aluminum trihydrate with a sufficient amount of water to provide a formed adsorbent material;
   drying the formed adsorbant material;
   calcining the formed adsorbant material at a temperature from about 350° C. to about 700° C.; and
   contacting said aqueous system with the dried and calcined formed adsorbant material until the arsenic is substantially removed from said aqueous system.

2. A method according to claim 1 wherein said bauxite contains at least 5% iron (as $Fe_2O_3$).

3. A method according to claim 1 wherein said bauxite contains at least 2% titanium (as $TiO_2$).

4. A method according to claim 1 wherein said bauxite and aluminum trihydrate are combined in a granule.

5. A method according to claim 1 wherein said system contains one or more competing ions.

6. A method according to claim 5 wherein said competing ions are selected from the group consisting of calcium, magnesium, sulphate, phosphate, chloride and fluoride ions.

7. A method according to claim 1, wherein the aluminum trihydrate powders have an average particle size from about 20 microns to about 75 microns.

* * * * *